(12) United States Patent
Bitar

(10) Patent No.: US 8,284,654 B2
(45) Date of Patent: Oct. 9, 2012

(54) BANDWIDTH ADMISSION CONTROL ON LINK AGGREGATION GROUPS

(75) Inventor: Nabil N. Bitar, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 452 days.

(21) Appl. No.: 11/949,249

(22) Filed: Dec. 3, 2007

(65) Prior Publication Data

US 2009/0141731 A1  Jun. 4, 2009

(51) Int. Cl.
*H04J 1/16* (2006.01)
(52) U.S. Cl. ........................................ 370/216; 370/230
(58) Field of Classification Search .................. 370/390, 370/401, 228, 389, 463, 216; 709/241
See application file for complete search history.

(56) References Cited

U.S. PATENT DOCUMENTS

| 7,526,570 | B2 * | 4/2009 | Rooholamini et al. | 709/241 |
|---|---|---|---|---|
| 2001/0029546 | A1 | 10/2001 | Motoyama | |
| 2003/0120817 | A1 | 6/2003 | Ott et al. | |
| 2005/0041683 | A1 * | 2/2005 | Kizer | 370/463 |
| 2005/0276263 | A1 * | 12/2005 | Suetsugu et al. | 370/389 |
| 2006/0018252 | A1 * | 1/2006 | Sridhar et al. | 370/216 |
| 2007/0160045 | A1 * | 7/2007 | Payyappilly et al. | 370/390 |
| 2007/0268915 | A1 * | 11/2007 | Zelig et al. | 370/401 |
| 2008/0112312 | A1 * | 5/2008 | Hermsmeyer et al. | 370/228 |
| 2008/0151890 | A1 * | 6/2008 | Zelig et al. | 370/390 |

* cited by examiner

*Primary Examiner* — Andrew Lai
*Assistant Examiner* — Syed M Bokhari

(57) ABSTRACT

A device may receive a bandwidth (B) available on each link of a link aggregation group (LAG) that includes a number (N) of links, assign a primary LAG link and a redundant LAG link to a virtual local area network (VLAN), set an available bandwidth for primary link booking to (B−B/N), and set an available bandwidth for redundant link booking to (B/N).

18 Claims, 8 Drawing Sheets

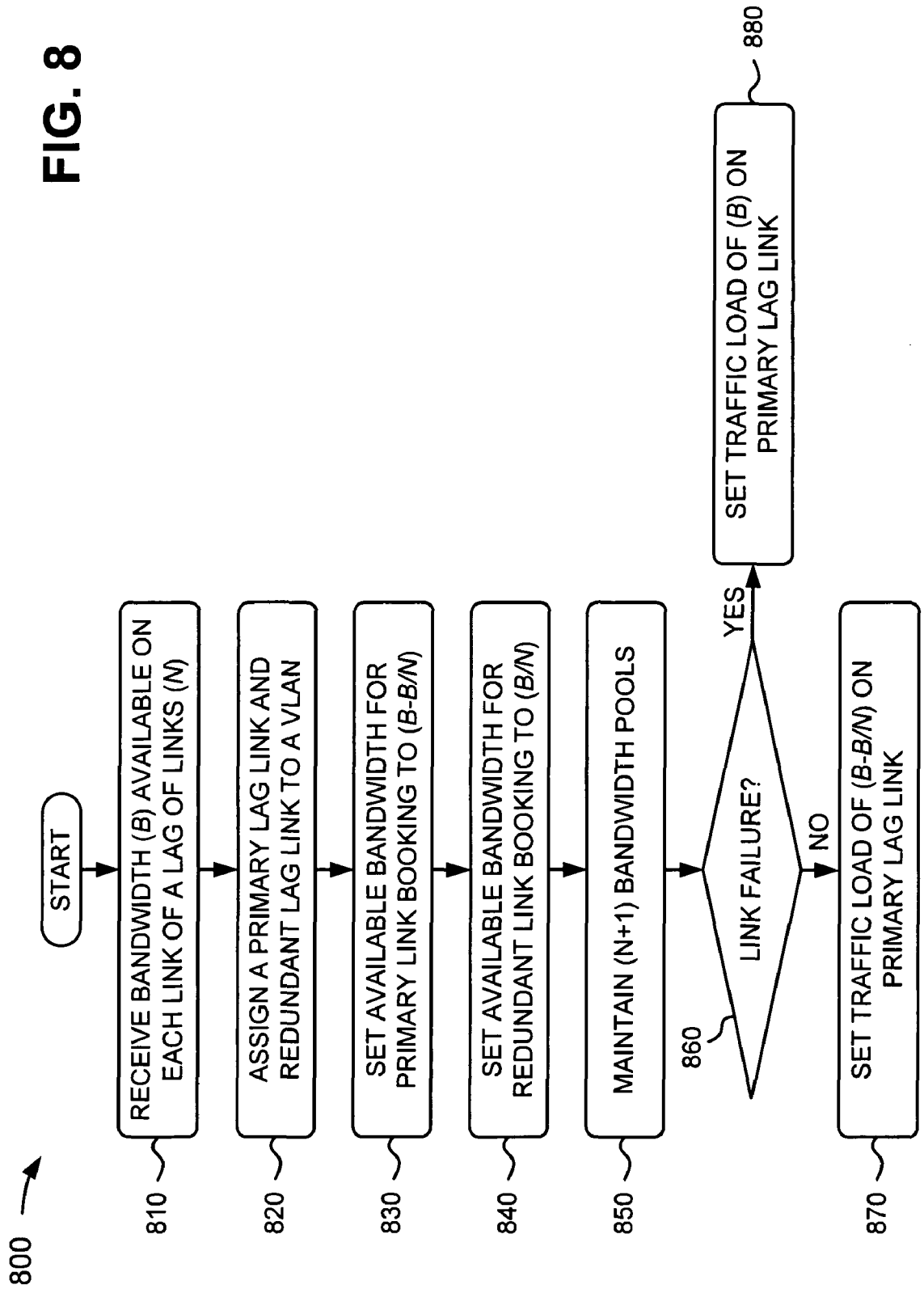

BANDWIDTH ADMISSION CONTROL ON LINK AGGREGATION GROUPS

BACKGROUND INFORMATION

A link aggregation (e.g., as set forth in IEEE 802.3ad) is a computer networking term which describes using multiple links (e.g., Ethernet network cables and/or ports in parallel) as one logical port to increase the link speed beyond the limits of any one single link and/or to provide for link redundancy between two network elements. Other terms used for link aggregation may include link bonding, link bundling, and/or link aggregation group (LAG). LAG will be used hereinafter to refer to link aggregation. A LAG may be provisioned between a pair of network elements, either locally or virtually. A LAG in a network element may span ports in the same packet processing line card or across packet processing line cards, providing protection against processing line card failure.

A LAG permits two network elements interconnected by the LAG to communicate simultaneously over all member links in the LAG. Network datagrams may be dynamically distributed across member links in the LAG based on a local rule so that administration of what datagrams actually flow across a given port may be taken care of automatically with the LAG.

A LAG, as set forth in IEEE 802.3ad, allows one or more links to be aggregated together to form a LAG. Once implemented, the LAG can be configured and reconfigured quickly and automatically with no risk of duplication or rendering of frames, and with minimum packet loss.

A LAG may be used to provide load balancing across multiple parallel links between two network devices. One method of load balancing used today is based on Internet Protocol (IP) header source and destination addresses. Another method, which may be used for non-IP protocols carried in Ethernet frames, is based on media access control (MAC) source and destination addresses. In typical networks, the load may not be divided equally among the links of a LAG. The statistical nature of traffic distribution across parameters (e.g., IP addresses) used by typical hashing algorithms may result in overloading certain links in the LAG while underutilizing other links in the LAG.

A LAG may provide local link protection. Should one of the multiple member links used in a LAG fail, network traffic (e.g., datagrams) may be dynamically redirected to flow across the remaining surviving links in the LAG. A LAG may redirect traffic to a surviving link based on a hashing algorithm. However, there is no upfront prediction of what traffic gets redirected over which link, and it is not predictable what link in the LAG may fail. In point-to-point Ethernet applications where a virtual local area network (VLAN) identifier (ID) is used to identify a connection between two edge Ethernet switches, the hashing can be made on the VLAN and/or other Ethernet header and/or payload information (e.g., IP header information if the Ethernet payload contains an IP packet). This may make it difficult to predict a load on a given link in the LAG, and may make it difficult to efficiently and predictably design an Ethernet network that provides packet-loss and bandwidth service level agreement (SLA) guarantees for point-to-point services. Point-to-point services known as ELine (Ethernet Private Line (EPL) or Ethernet Virtual Private Line (EVPL)) may be the most stringent services in terms of SLAs.

BRIEF DESCRIPTION OF THE DRAWINGS

FIGS. 6-8 depict flowcharts of exemplary processes for a network and/or a network device of FIG. 1 according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may guarantee SLAs for point-to-point services in the presence of multi-point services on a link aggregation group (LAG). In one implementation, the systems and methods may ensure that point-to-point services may share a LAG with multi-point traffic while still guaranteeing that the point-to-point services have a predictable behavior. In another implementation, the systems and methods may allocate corresponding point-to-point connections to queues on a link of the LAG via a management mechanism and/or via signaling. In other implementations, the systems and methods may receive a bandwidth available on each link of the LAG, may assign a primary LAG link and a redundant LAG link to a virtual local area network (VLAN), and may set an available bandwidth for primary link booking and redundant link booking.

Figure 1:
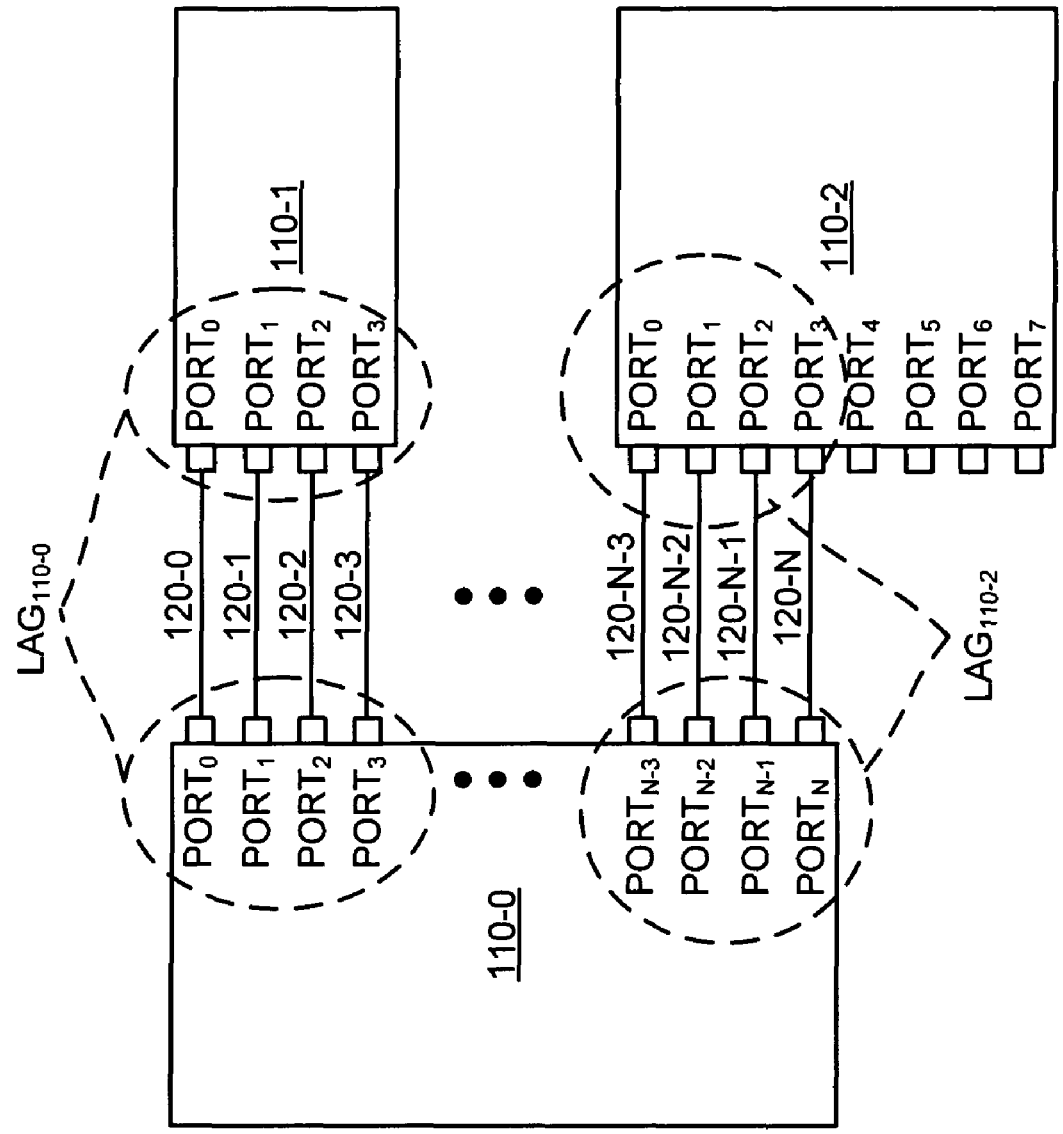
FIG. 1 is an exemplary diagram of a network in which systems and methods described herein may be implemented.

FIG. 1 is a diagram illustrating an exemplary network 100 in which systems and methods described herein may be implemented. Network 100 may include, for example, a local area network (LAN), a private network (e.g., a company intranet), a wide area network (WAN), a metropolitan area network (MAN), or another type of network. In one implementation, network 100 may include a switched network that provides point-to-point and multi-point services, a network capable of using a VLAN, etc.

As shown in FIG. 1, network 100 may include network devices 110-0, 110-1 and 110-2 (collectively referred to as network devices 110) interconnected by links 120-0, . . . , 120-N (collectively referred to as links 120). While three network devices 110 and eight links 120 are shown in FIG. 1, more or fewer network devices 110 and/or links 120 may be used in other implementations.

Network device 110 may include a variety of devices. For example, network device 110 may include a computer, a router, a switch, a network interface card (NIC), a hub, a bridge, etc. Links 120 may include a path that permits communication among network devices 110, such as wired connections, input ports, output ports, etc. For example, network device 110-0 may include ports $PORT_0$, $PORT_1$, . . . , $PORT_N$, network device 110-1 may include ports $PORT_0$, $PORT_1$, $PORT_2$, $PORT_3$, and network device 110-2 may include ports $PORT_0$, $PORT_1$, . . . , $PORT_7$. The ports of network devices 110 may be considered part of corresponding links 120 and may be either input ports, output ports, or combinations of input and output ports. While eight ports for network device 110-0, four ports for network device 110-1, and eight ports for network device 110-2 are shown in FIG. 1, more or fewer ports may be used in other implementations.

In an exemplary implementation, network devices 110 may provide entry and/or exit points for datagrams (e.g., traffic) in network 100. The ports (e.g., $PORT_0$, ..., and $PORT_N$) of network device 110-0 may send and/or receive datagrams. The ports (e.g., $PORT_0$, $PORT_1$, $PORT_2$, and $PORT_3$) of network device 110-1 and the ports (e.g., $PORT_0$, ..., and $PORT_7$) of network device 110-2 may likewise send and/or receive datagrams.

In one implementation, a LAG may be established between network devices 110-0 and 110-1. For example, ports $PORT_0$, ..., and $PORT_3$ of network device 110-0 may be grouped together into a $LAG_{110-0}$ that communicates bi-directionally with ports $PORT_0$, $PORT_1$, $PORT_2$, and $PORT_3$ of network device 110-1, via links 120-0, 120-1, 120-2, and 120-3. Datagrams may be dynamically distributed between ports (e.g., $PORT_0$, $PORT_1$, $PORT_2$, and $PORT_3$) of network device 110-0 and ports (e.g., $PORT_0$, $PORT_1$, $PORT_2$, and $PORT_3$) of network device 110-1 so that administration of what datagrams actually flow across a given link (e.g., links 120-0, ..., and 120-3) may be automatically handled by $LAG_{110-0}$.

In another implementation, a LAG may be established between network devices 110-0 and 110-2. For example, ports $PORT_{N-3}$, ..., and $PORT_N$ of network device 110-0 may be grouped together into a $LAG_{110-2}$ that communicates bi-directionally with ports $PORT_0$, $PORT_1$, $PORT_2$, and $PORT_3$ of network device 110-2, via links 120-N-3, 120-N-2, 120-N-1, and 120-N. Ports $PORT_0$, $PORT_1$, $PORT_2$, and $PORT_3$ of network device 110-2 may be grouped together into $LAG_{110-2}$. $LAG_{110-2}$ may permit ports $PORT_{N-3}$, ..., and $PORT_N$ of network device 110-0 and ports $PORT_0$, $PORT_1$, $PORT_2$, and $PORT_3$ of network device 110-2 to communicate bi-directionally. Datagrams may be dynamically distributed between ports (e.g., $PORT_{N-3}$, ..., and $PORT_N$) of network device 110-0 and ports (e.g., $PORT_0$, $PORT_1$, $PORT_2$, and $PORT_3$) of network device 110-2 so that administration of what datagrams actually flow across a given link (e.g., links 120-N-3, ..., and 120-N) may be automatically handled by $LAG_{110-2}$. With such an arrangement, network devices 110 may transmit and receive datagrams simultaneously on all links within a LAG established by network devices 110.

Although FIG. 1 shows exemplary components of network 100, in other implementations, network 100 may contain fewer, different, or additional components than depicted in FIG. 1. In still other implementations, one or more components of network 100 may perform the tasks performed by one or more other components of network 100.

Figure 2:
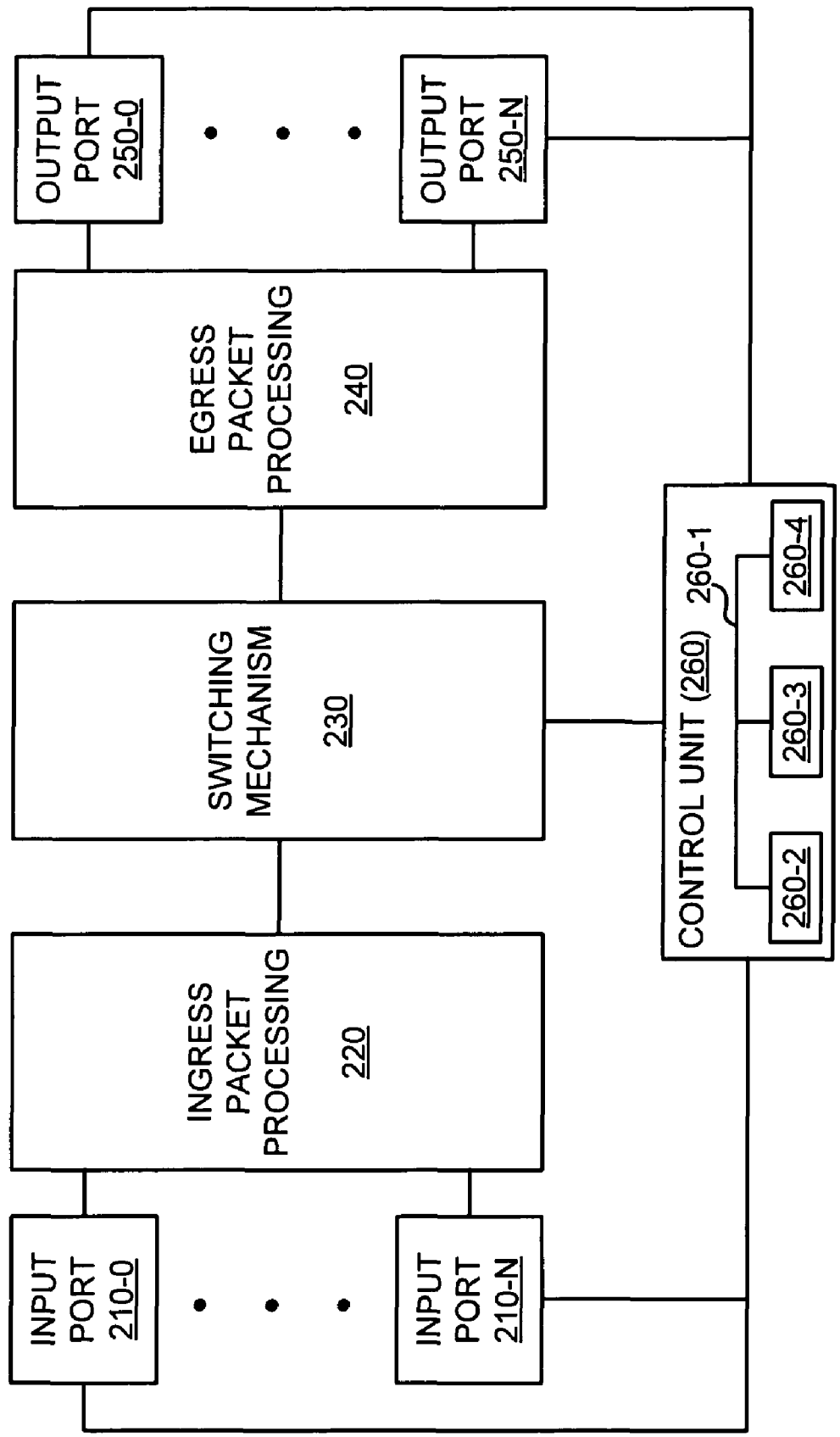
FIG. 2 is a diagram of an exemplary network device of FIG. 1.

FIG. 2 is an exemplary diagram of a device that may correspond to one of network devices 110 of FIG. 1. As illustrated, network device 110 may include input ports 210, an ingress packet processing block 220, a switching mechanism 230, an egress packet processing block 240, output ports 250, and a control unit 260. In one implementation, ingress packet processing block 220 and egress packet processing block 240 may be on the same line card.

Input ports 210 may be the point of attachment for a physical link (e.g., link 120) (not shown) and may be the point of entry for incoming datagrams. Ingress packet processing block 220 may store forwarding tables and may perform forwarding table lookup to determine to which egress packet processing and/or output port that a datagram may be forwarded. Switching mechanism 220 may interconnect ingress packet processing block 220 and egress packet processing block 240, as well as associated input ports 210 and output ports 250. Egress packet processing block 240 may store datagrams and may schedule datagrams for service on an output link (e.g., link 120) (not shown). Output ports 250 may be the point of attachment for a physical link (e.g., link 120) (not shown) and may be the point of exit for datagrams. Control unit 260 may run routing protocols and Ethernet control protocols, build forwarding tables and download them to ingress packet processing block 220 and/or egress packet processing block 240, etc.

Ingress packet processing block 220 may carry out data link layer encapsulation and decapsulation. In order to provide quality of service (QoS) guarantees, ingress packet processing block 220 may classify datagrams into predefined service classes. Input ports 210 may run data link-level protocols. In other implementations, input ports 210 may send (e.g., may be an exit point) and/or receive (e.g., may be an entry point) datagrams.

Switching mechanism 230 may be implemented using many different techniques. For example, switching mechanism 230 may include busses, crossbars, and/or shared memories. The simplest switching mechanism 230 may be a bus that links input ports 210 and output ports 250. A crossbar may provide multiple simultaneous data paths through switching mechanism 230. In a shared-memory switching mechanism 230, incoming datagrams may be stored in a shared memory and pointers to datagrams may be switched.

Egress packet processing block 240 may store datagrams before they are transmitted on an output link (e.g., link 120). Egress packet processing block 240 may include scheduling algorithms that support priorities and guarantees. Egress packet processing block 240 may support data link layer encapsulation and decapsulation, and/or a variety of higher-level protocols. In other implementations, output ports 230 may send (e.g., may be an exit point) and/or receive (e.g., may be an entry point) datagrams.

Control unit 260 may interconnect with input ports 210, ingress packet processing block 220, switching mechanism 230, egress packet processing block 240, and output ports 250. Control unit 260 may compute a forwarding table, implement routing protocols, and/or run software to configure and manage network device 110. In one implementation, control unit 260 may include a bus 260-1 that may include a path that permits communication among a processor 260-2, a memory 260-3, and a communication interface 260-4. Processor 260-2 may include a microprocessor or processing logic that may interpret and execute instructions. Memory 260-3 may include a random access memory (RAM), a read only memory (ROM) device, a magnetic and/or optical recording medium and its corresponding drive, and/or another type of static and/or dynamic storage device that may store information and instructions for execution by processor 260-2. Communication interface 260-3 may include any transceiver-like mechanism that enables control unit 260 to communicate with other devices and/or systems.

Network device 110 may perform certain operations, as described herein. Network device 110 may perform these operations in response to processor 260-2 executing software instructions contained in a computer-readable medium, such as memory 260-3. A computer-readable medium may be defined as a physical or logical memory device.

The software instructions may be read into memory 260-3 from another computer-readable medium, such as a data storage device, or from another device via communication interface 260-4. The software instructions contained in memory 260-3 may cause processor 260-2 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 110, in other implementations, network device 110 may contain fewer, different, or additional components than depicted in FIG. 2. In still other implementations, one or more components of network device 110 may perform the tasks performed by one or more other components of network device 110.

Figure 3:
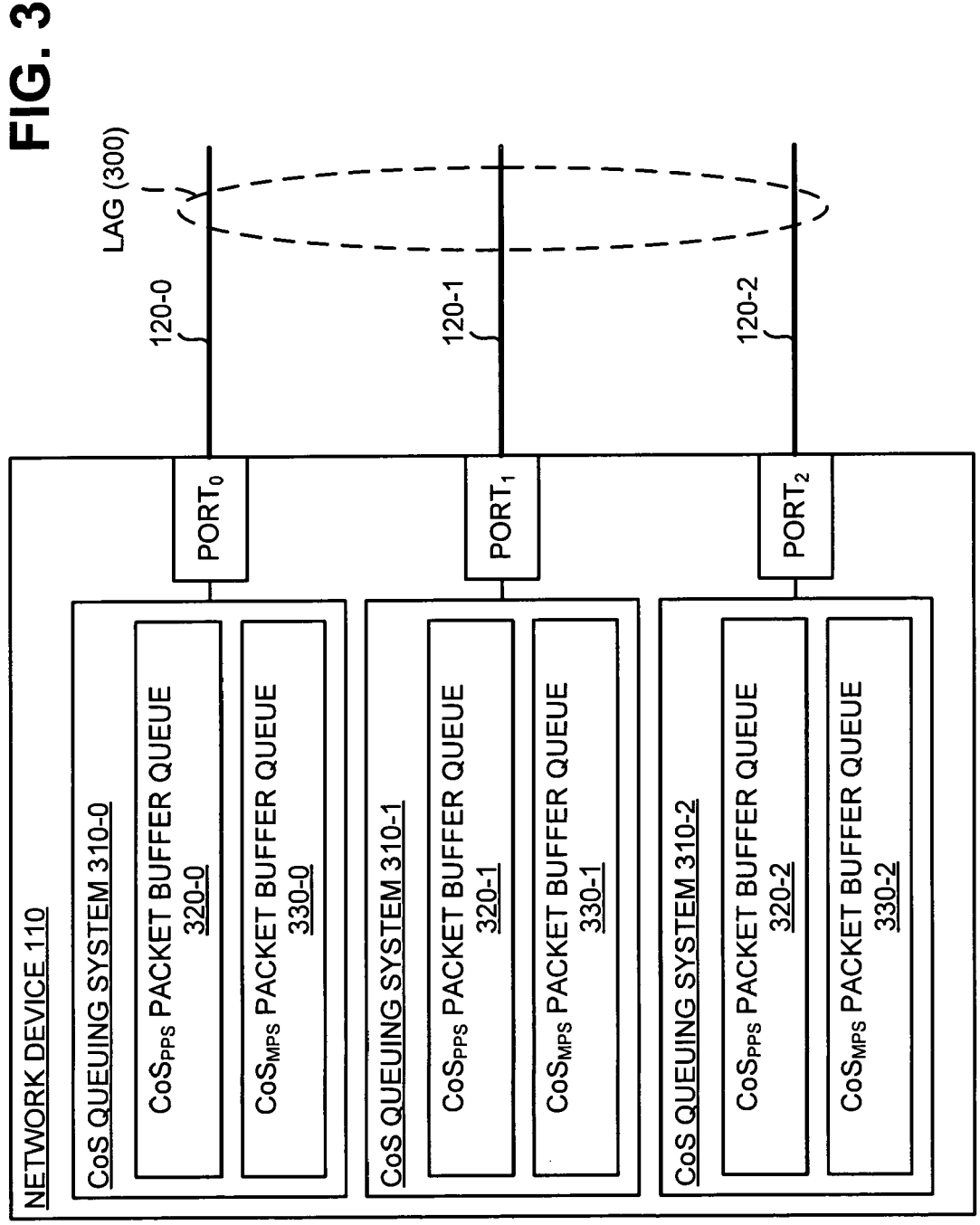
FIG. 3 is a diagram showing exemplary Class of Service (CoS) queues of the network device of FIG. 2.

FIG. 3 is a diagram showing exemplary Class of Service (CoS) queues of network device 110. It may be assumed for simplicity that network device 110 may define a CoS for point-to-point services and may define another CoS for multi-point services. In other implementations, there may be more than one CoS for point-to-point services and/or multi-point services. As shown in FIG. 3, network device 110 may include one or more CoS queues for each link of network device 110. For example, link 120-0 may be associated with one or more CoS queuing systems 310-0, link 120-1 may be associated with one or more CoS queuing systems 310-1, and link 120-2 may be associated with one or more CoS queuing systems 310-2. Each of CoS queuing systems 310-0, 310-1, and 310-2 (collectively referred to as CoS queuing systems 310) may include a separate packet queue allocated for each network service, or each CoS corresponding to a network service, to a corresponding link. For example, CoS queuing system 310-0 may include a $CoS_{PPS}$ packet queue 320-0 allocated for point-to-point services to link 120-0, and a $CoS_{MPS}$ packet queue 330-0 allocated for multi-point services to link 120-0. CoS queuing system 310-1 may include a $CoS_{PPS}$ packet queue 320-1 allocated for point-to-point services to link 120-1, and a $CoS_{MPS}$ packet queue 330-1 allocated for multi-point services to link 120-1. CoS queuing system 310-2 may include a $CoS_{PPS}$ packet queue 320-2 allocated for point-to-point services to link 120-2, and a $CoS_{MPS}$ packet queue 330-2 allocated for multi-point services to link 120-2.

$CoS_{PPS}$ packet buffer queues 320-0, 320-1, and 320-2 (collectively referred to as $CoS_{PPS}$ packet buffer queues 320) may be allocated bandwidth on a LAG 300 (e.g., defined by links 120-0, 120-1, and 120-2) so that point-to-point services may have a minimum guaranteed bandwidth. $CoS_{MPS}$ packet buffer queues 330-0, 330-1, and 330-2 (collectively referred to as $CoS_{MPS}$ packet buffer queues 330) may be allocated bandwidth on LAG 300 so that multi-point services may have a minimum guaranteed bandwidth.

In one implementation, a point-to-point connection may be identified by a VLAN value in a header, which may permit operation over native Ethernet networks. In other implementations, the point-to-point connection may be identified by any type of connection identifier (e.g., a generic Multiprotocol Label Switching (MPLS) label).

Although FIG. 3 shows exemplary components of network device 110, in other implementations, network device 110 may contain fewer, different, or additional components than depicted in FIG. 3. In still other implementations, one or more components of network device 110 may perform the tasks performed by one or more other components of network device 110.

Figure 4:
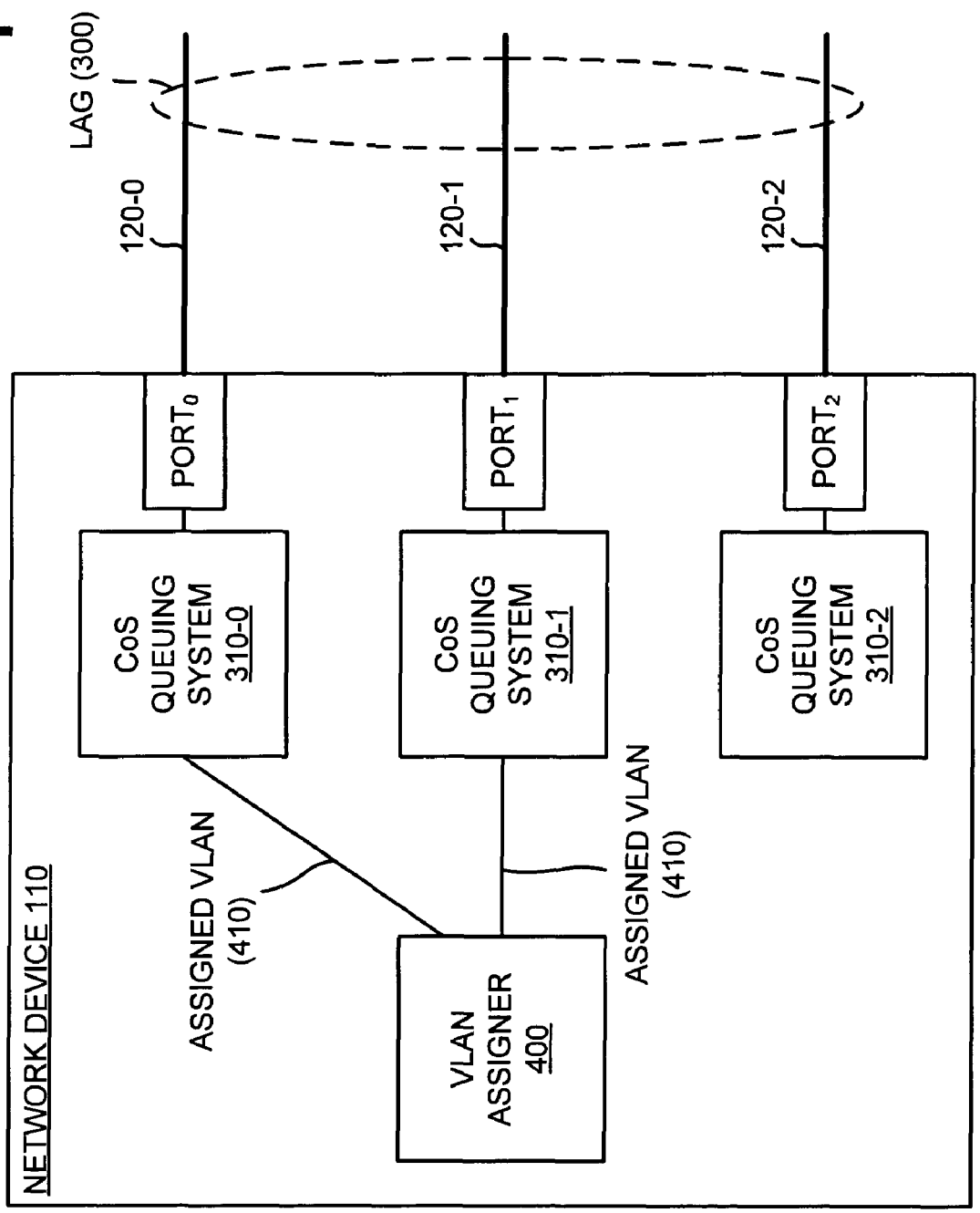
FIG. 4 is a diagram illustrating an exemplary VLAN assigner of the network device of FIG. 2.

FIG. 4 is a diagram illustrating an exemplary VLAN assigner 400 of network device 110. In one implementation, a VLAN may be assigned to one or more links (e.g., links 120) on a LAG (e.g., LAG 300). Typical equipment do not permit such an assignment, but rather assign a VLAN to a LAG and do not assign the VLAN to a specific link in the LAG. As shown in FIG. 4, VLAN assigner 400 may assign a VLAN to one or more links in a LAG for redundancy purposes. For example, VLAN assigner 400 may assign a VLAN 410 to link 120-0, via CoS queuing system 310-0 and $PORT_0$, and may also assign VLAN 410 to link 120-1, via CoS queuing system 310-1 and $PORT_1$. Traffic from a given VLAN (e.g., VLAN 410) may be transmitted on the links (e.g., links 120-0 and 120-1) in the LAG to which that VLAN is assigned. Although FIG. 4 shows VLAN 410 being assigned to two of the three links 120 depicted, in other implementations, VLAN 410 may be assigned to one or more links 120.

If VLAN assigner 400 assigns VLANs to a LAG (e.g., a LAG with a predetermined bandwidth), the VLANs may be admitted to a corresponding queue on the LAG so that the sum of active VLANs' bandwidths allocated to the queue may not exceed a bandwidth allocated for the queue multiplied by an oversubscription factor.

Although FIG. 4 shows exemplary components of network device 110, in other implementations, network device 110 may contain fewer, different, or additional components than depicted in FIG. 4. In still other implementations, one or more components of network device 110 may perform the tasks performed by one or more other components of network device 110. In further implementations, network device 110 may include the features set forth in co-pending Application No. 11/949,164 entitled "PINNING AND PROTECTION ON LINK AGGREGATION GROUPS," filed on the same date herewith, the disclosure of which is incorporated by reference herein in its entirety.

Primary path bandwidth allocator 500 may receive, at a start time prior to allocating any VLAN, a bandwidth (B) 530 available on each link in a LAG for a point-to-point VLAN, and a number of links (N) 540 in the LAG. Primary path bandwidth allocator 500 may allocate an available bandwidth for primary path booking (B−B/N) 550 on each link, and may provide bandwidth (B/N) 560 on each link for redundant path allocator 510. The available bandwidth for primary path booking and redundant path booking may be set to different values than (B−B/N) and (B/N), respectively, but may be assigned such that a sum of bandwidths available to each allocator per link is equal to bandwidth (B). When selecting a link to be the primary path of a VLAN, a bandwidth for that VLAN may be allocated from an available primary bandwidth pool. Available bandwidth for primary path booking (B−B/N) 550 for each link may be provided to bandwidth pool maintainer 520.

Redundant path bandwidth allocator 510 may receive available bandwidth for redundant path booking (B/N) 560 on each link in a LAG and a number of links (N) in the LAG. Available bandwidth for redundant path booking (B/N) 560 for each link may be provided to bandwidth pool maintainer 520.

Bandwidth pool maintainer 520 may receive available bandwidth for primary path booking (B−B/N) 550 and available bandwidth for redundant path booking (B/N) 560, and may maintain a number (e.g., N+1) of bandwidth pools. In one implementation, bandwidth pool maintainer 520 may maintain the following bandwidth pools for each Link_n:

Link_n_0_Redundancy_available_Bandwidth

Link_n_1_Redundancy_available_Bandwidth

Link_n_Primary available_Bandwidth

Link_n_N_Redundancy_available_bandwidth.

At time "0," if no VLANs are allocated to links, the bandwidth pools may be initialized as follows:

Link_*n*_0_Redundancy_available_Bandwidth=*B/N*

Link_*n*_1_Redundancy_available_Bandwidth=*B/N*

Link_n_Primary_available_Bandwidth=$B-(B/N)$

Link_n_N_Redundancy_available_bandwidth=$B/N$.

Each link, other than Link₁₃ n, may have up to (B/N) bandwidth protected on Link_n. In one implementation, a set of VLANs whose primary links do not include Link_n may be protected on Link_n and each of these links may get the full (B/N) redundancy bandwidth on Link_n. Therefore, the total bandwidth of the protected VLANs on Link_n may be equal to ((N−1)*B/N). In this example, if it is assumed that the primary bandwidth on Link_n is allocated to VLANs, and the bandwidths Link_0_Redundancy_available_Bandwidth and Link_1_Redundancy_available_Bandwidth are allocated to protect VLANs on Link_0 and Link_1, respectively, the state of bandwidth pools for Link_n in bandwidth pool maintainer 520 may be as follows:

Link_n_0_Redundancy_available_Bandwidth=0

Link_n_1_Redundancy_available_Bandwidth=0

Link_n_2_Redundancy_available_Bandwidth=$B/N$

Link_n_Primary_available_Bandwidth=0

Link_n_N_Redundancy_available_bandwidth=$B/N$.

Figure 5:
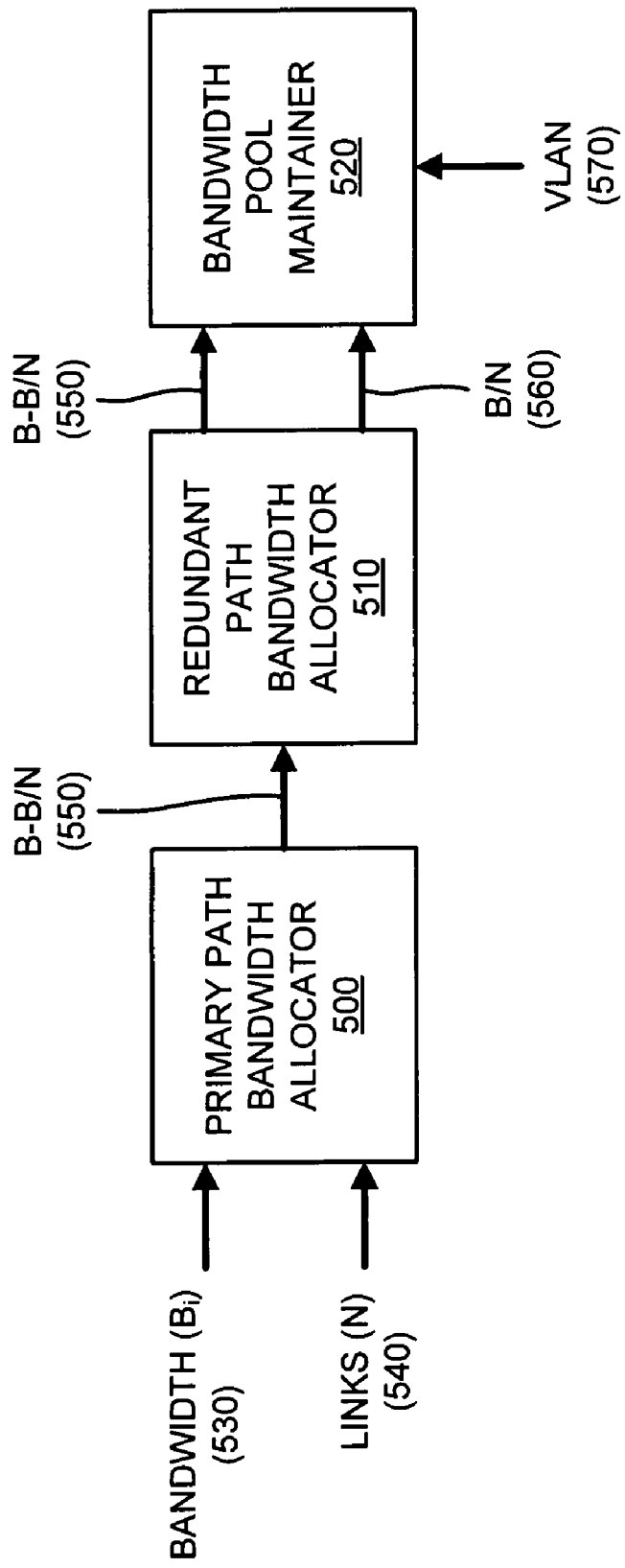
FIG. 5 is a functional block diagram showing exemplary functional components of a control unit of the network device of FIG. 2.

If there is no link failure, point-to-point traffic load on the primary link (e.g., Link_n) may be (B−(B/N)). If a link (e.g., Link_0) fails, the VLANs protected on the primary link (e.g., Link_n) may transmit traffic on Link_n, and the point-to-point traffic load set on Link_n may be (B) (e.g., the maximum bandwidth available for point-to-point traffic on Link_n). When VLAN assigner 400 assigns a primary path to a link (e.g., Link_n), it may ensure that the VLAN bandwidth is less than or equal to the available primary bandwidth on that link (e.g., Link_n_Primary_available_Bandwidth). VLAN assigner 400 may also update the bandwidth pool maintainer 520 with this allocation. Subsequently, bandwidth pool maintainer 520 may adjust the available primary bandwidth on Link_n by subtracting the VLAN bandwidth from Link_n_Primary_available_Bandwidth. If VLAN assigner 400 assigns the same VLAN to Link_0 for protection, it may ensure that the VLAN bandwidth is less than or equal to Link_0_n_Redundancy_available_bandwidth on Link_0. VLAN assigner 400 may also update bandwidth pool maintainer 520 with this allocation. Bandwidth pool maintainer 520 may adjust the available redundancy bandwidth on Link_0 for Link_n by subtracting the VLAN bandwidth from Link_0_n_Redundancy_available_bandwidth on Link_0. As shown in FIG. 5, if VLAN 570 is admitted to Link_n primary bandwidth and Link_0 redundancy bandwidth for Link_n, bandwidth pool maintainer 520 may decrease the available primary bandwidth on Link_n by the VLAN bandwidth and the available redundancy bandwidth for Link_n on Link_0 by the VLAN bandwidth.

In the example described above, for Link_0 and Link_1 traffic protected on Link_n, protection may be provided without overloading the primary link (e.g., Link_n) under a single link failure (e.g., a failure of Link_0 or Link_1). If both links fail (e.g., a failure of Link_0 and Link_1), however, the bandwidth load on Link_n may be (B+B/N). The example assumed a ((N−1):1) link protection scheme when using a LAG of (N) links. In other implementations, the VLANs may be selectively protected, and the redundancy scheme may be applied based on a (X:1) link protection scheme, where (X) may range from "1" to (N−1). In still other implementations, the scheme described herein may be applied to primary and redundant paths, for a given VLAN, that are allocated on different links and/or LAGs terminating on different neighboring network devices, which may provide link and next-hop network device protection. In yet another implementation, protection may be provided on a link basis such that all VLANs whose primary path is Link_0 and Link_1 may be protected on Link_n, for example. If Link_0 fails, protected traffic may be directed from Link_0 to Link_n. If Link_1 fails, traffic from Link_1 may not be switched over to Link_n so that Link_n does not get overloaded. Various implementations and/or configurations, that are variations of these examples, are also possible providing a tradeoff between the amount of protection, the amount of link overloading that can be tolerated, and amount of traffic that can be protected.

In the scheme described herein, protection of VLAN traffic was considered at a VLAN level. However, the scheme may also protect at a VLAN and CoS level so that the assignment of a VLAN primary path and redundant path to a link may be accomplished based on admission control to the bandwidth pool allocated for the CoS on the link. Bandwidth allotted for primary path allocation may be further subdivided across CoSs and bandwidth may be allotted for redundant paths.

Although FIG. 5 shows exemplary functional components of control unit 260, in other implementations, control unit 260 may contain fewer, different, or additional functional components than depicted in FIG. 5. In still other implementations, one or more functional components of control unit 260 may perform the tasks performed by one or more other functional components of control unit 260.

Figure 6:
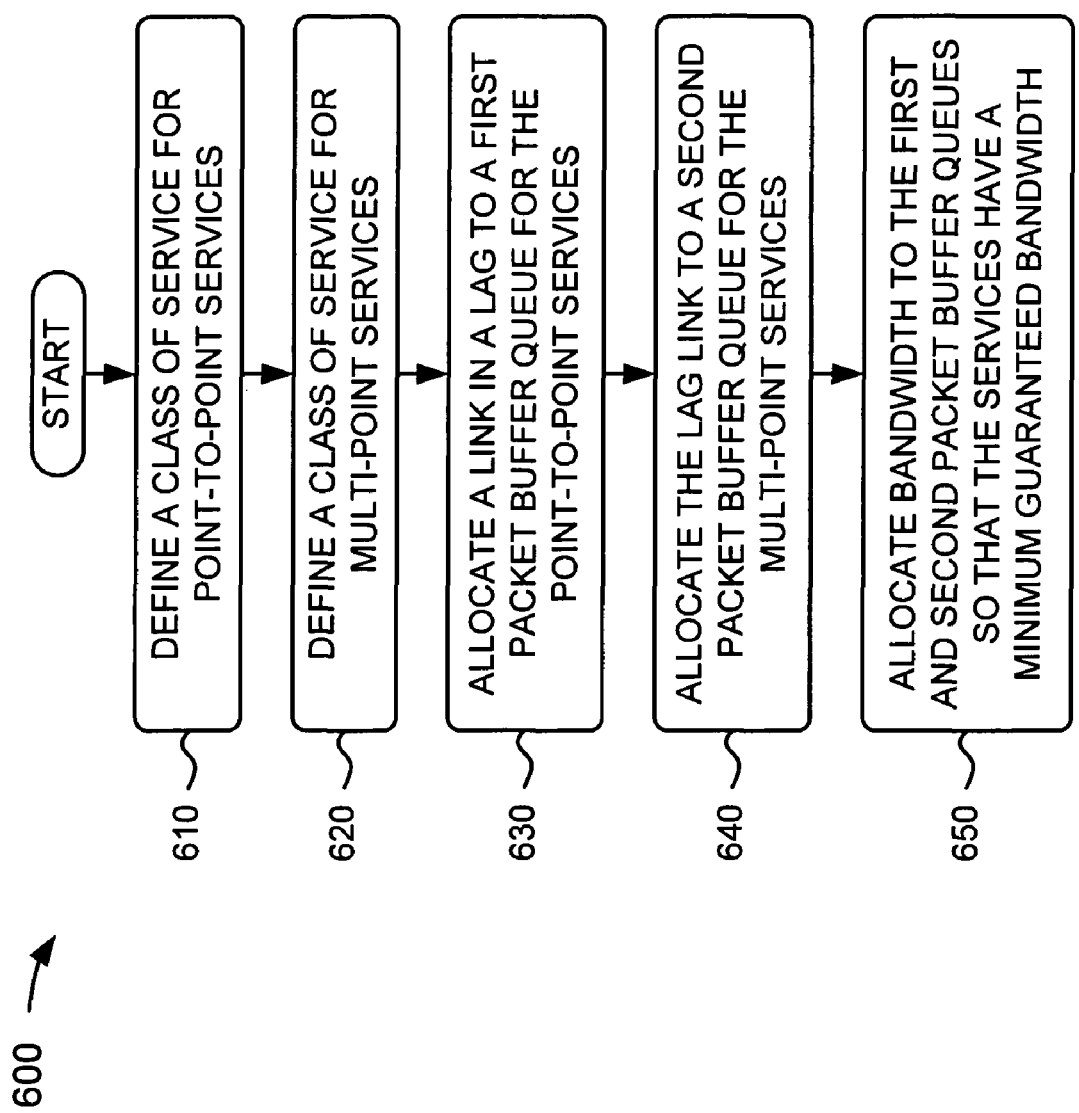
Figure 7:
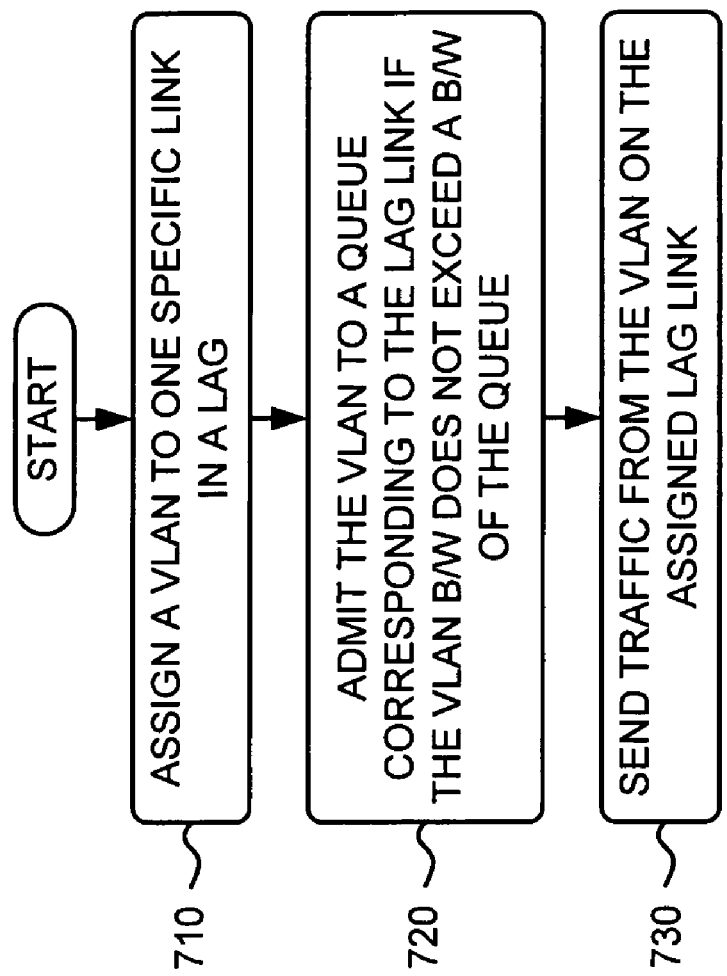

FIGS. 6-8 depict flowcharts of exemplary processes for a network (e.g., network 100) and/or a network device (e.g., network device 110). In one implementation, the processes of FIGS. 6-8 may be performed by hardware and/or software components of a device of a network or may be performed by hardware and/or software components of a device external to the network but communicating with the network. In other implementations, the processes of FIGS. 6-8 may be performed by hardware and/or software components of network device 110 (e.g., by control unit 260) and/or one or more devices in network 100.

FIG. 6 depicts a flowchart of an exemplary process 600 for allocating a LAG link to a packet buffer queue for point-to-point services, and to another packet buffer queue for multi-point services. As shown in FIG. 6, process 600 may begin by defining a class of service for point-to-point services (block 610), and defining a class of service for multi-point services (block 620). For example, in one implementation described above in connection with FIG. 3, network device 110 may define a class of service (CoS) for point-to-point services and may define another CoS for multi-point services.

As further shown in FIG. 6, a link in a LAG may be allocated to a first packet buffer queue for the point-to-point services (block 630). For example, in one implementation described above in connection with FIG. 3, CoS queuing system 310-0 may include $CoS_{PPS}$ packet buffer queue 320-0 allocated for point-to-point services to link 120-0, CoS queuing system 310-1 may include $CoS_{PPS}$ packet buffer queue 320-1 allocated for point-to-point services to link 120-1, and CoS queuing system 310-2 may include a $CoS_{PPS}$ packet buffer queue 320-2 allocated for point-to-point services to link 120-2.

The LAG link may be allocated to a second packet buffer queue for the multi-point services (block 640). For example, in one implementation described above in connection with FIG. 3, CoS queuing system 310-0 may include $CoS_{MPS}$ packet buffer queue 330-0 allocated for multi-point services to link 120-0, CoS queuing system 310-1 may include $CoS_{MPS}$ packet buffer queue 330-1 allocated for multi-point services to link 120-1, and CoS queuing system 310-2 may include $CoS_{MPS}$ packet buffer queue 330-2 allocated for multi-point services to link 120-2.

As further shown in FIG. 6, a bandwidth may be allocated to the first and second packet buffer queues so that the point-to-point and multi-point services have a minimum guaranteed bandwidth (block 650). For example, in one implementation described above in connection with FIG. 3, $CoS_{PPS}$ packet buffer queues 320-0, 320-1, and 320-2 may be allocated bandwidth on LAG 300 (e.g., defined by links 120-0, 120-1, and 120-2) so that point-to-point services may have a minimum guaranteed bandwidth. $CoS_{MPS}$ packet buffer queues 330-0, 330-1, and 330-2 may be allocated bandwidth on LAG 300 so that multi-point services may have a minimum guaranteed bandwidth.

FIG. 7 depicts a flowchart of an exemplary process 700 for assigning a VLAN to one or more links of a LAG. As shown in FIG. 7, process 700 may begin by assigning a VLAN to a specific link in a LAG (block 710). For example, in one implementation described above in connection with FIG. 4, VLAN assigner 400 may assign a VLAN to one or more links in a LAG for redundancy purposes. In one example, VLAN assigner 400 may assign VLAN 410 to link 120-0, via CoS queuing system 310-0 and $PORT_0$, and may also assign VLAN 410 to link 120-1, via CoS queuing system 310-1 and $PORT_1$.

As further shown in FIG. 7, the VLAN may be admitted to a queue corresponding to the assigned LAG link if the VLAN bandwidth does not exceed a bandwidth of the queue (block 720). For example, in one implementation described above in connection with FIG. 4, if VLAN assigner 400 assigns VLANs to a LAG with a predetermined bandwidth, the VLANs may be admitted to a corresponding queue on the LAG so that the sum of active VLANs' bandwidths allocated to the queue may not exceed a queue bandwidth multiplied by an oversubscription factor.

Traffic may be sent from the VLAN on the assigned LAG link (block 730). For example, in one implementation described above in connection with FIG. 4, traffic from a given VLAN (e.g., VLAN 410) may be transmitted on the links (e.g., links 120-0 and 120-1) in the LAG to which that VLAN is assigned. In other implementations, where it may be necessary to transmit traffic from a same VLAN on one link, traffic from a given VLAN (e.g., VLAN 410) may be transmitted on the links (e.g., links 120-0 or 120-1) in a LAG to which VLAN is assigned, where one link may be active (e.g., link 120-0) and the other link may be on standby (e.g., link 120-1).

FIG. 8 depicts a flowchart of an exemplary process 800 for assigning VLANs to links in a LAG based on an admission control mechanism. As shown in FIG. 8, process 800 may begin by receiving a bandwidth (B) available on each link of a LAG that includes a number of links (N) (block 810). For example, in one implementation described above in connection with FIG. 5, primary path bandwidth allocator 500 may receive, at a start time prior to allocating any VLAN, bandwidth (B) 530 available on each link in a LAG, and number of links (N) 540 in the LAG.

A primary LAG link and a redundant LAG link may be assigned to a VLAN (block 820). For example, in one implementation described above in connection with FIG. 5, primary path bandwidth allocator 500 may assign a primary link in the LAG to a VLAN, and redundant path bandwidth allocator 510 may assign a redundant link in the LAG to the VLAN assigned to the primary link by primary path bandwidth allocator 500.

As further shown in FIG. 8, an available bandwidth for primary link booking may be set to (B−B/N) (block 830), and an available bandwidth for redundant link booking may be set to (B/N) (block 840). For example, in one implementation described above in connection with FIG. 5, primary path bandwidth allocator 500 may allocate available bandwidth for primary path (or link) booking (B−B/N) 550 on each link. Redundant path bandwidth allocator 510 may receive available bandwidth for redundant path booking (B/N) 560 on each link in a LAG and a number of links (N) in the LAG. Available bandwidth for redundant path booking (B/N) 560 for each link may be provided to bandwidth pool maintainer 520.

A number (N+1) of bandwidth pools may be maintained (block 850). For example, in one implementation described above in connection with FIG. 5, bandwidth pool maintainer 520 may receive available bandwidth for primary path booking (B−B/N) 550 and available bandwidth for redundant path booking (B/N) 560 for each link in a LAG, and may maintain a number (e.g., N+1) of bandwidth pools.

As further shown in FIG. 8, if no link failure occurs in the LAG (block 860-NO), then a traffic load of (B−B/N) may be set on the primary LAG link (block 870). For example, in one implementation described above in connection with FIG. 5, if there is no link failure, a point-to-point traffic load on the primary link (e.g., Link_n) may be (B−(B/N)).

If a link failure occurs (block 860-YES), then a traffic load of (B) may be set on the primary LAG link (block 880). For example, in one implementation described above in connection with FIG. 5, if a link (e.g., Link_0) fails, the VLANs protected on the primary link (e.g., Link_n) may transmit traffic on Link_n, and the point-to-point traffic load set on Link_n may be (B) (e.g., the maximum bandwidth available for point-to-point traffic on Link_n).

Systems and methods described herein may guarantee SLAs for point-to-point services in the presence of multi-point services on a LAG. In one implementation, the systems and methods may ensure that point-to-point services may share a LAG with multi-point traffic while still guaranteeing that the point-to-point services have a predictable behavior. In another implementation, the systems and methods may allocate corresponding point-to-point connections to queues on a link of the LAG via a management mechanism and/or via signaling. In other implementations, the systems and methods may receive a bandwidth available on each link of the LAG, may assign a primary LAG link and a redundant LAG link to a virtual local area network (VLAN), and may set an available bandwidth for primary link booking and redundant link booking.

The foregoing description provides illustration and description, but is not intended to be exhaustive or to limit the invention to the precise form disclosed. Modifications and variations are possible in light of the above teachings or may be acquired from practice of the invention.

For example, while series of acts have been described with regard to the flowcharts of FIGS. 6-8, the order of the acts may differ in other implementations. Further, non-dependent acts may be performed in parallel. In another example, although FIG. 5 shows tasks being performed by functional components of control unit 260 of network device 110, in other implementations, the tasks shown in FIG. 5 may be performed by other components of network device 110, such as, e.g., switching mechanism 220. Alternatively, some of the tasks shown in FIG. 5 may be performed by another device (outside network device 110).

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method comprising: receiving, using one or more processors, information identifying a bandwidth (B) available on each link of a link aggregation group (LAG) that includes a number (N) of links; assigning, using one or more processors, a primary LAG link, in the LAG, and a redundant LAG link, in the LAG, to a virtual local area network (VLAN); setting, using one or more processors, an available bandwidth for primary link booking, on each of the primary LAG link and the redundant LAG link, to (B−B/N); setting, using one or more processors, an available bandwidth for redundant link booking, on each of the primary LAG link and the redundant LAG link, to (B/N); updating information identifying bandwidth pools that are associated with the primary LAG link, where the information identifying the bandwidth pools includes information identifying the available bandwidth for primary link booking associated with the primary LAG link, where updating the information identifying the bandwidth pools includes: updating the information identifying the available bandwidth for primary link booking associated with the primary LAG link based on information identifying bandwidth associated with the VLAN; setting, using one or more processors, a first traffic load of (B−B/N) on the primary LAG link when no link failure exists for the LAG; setting, using one or more processors, a second traffic load of (B) on the primary LAG link when the LAG experiences a failure of a link, in the LAG, different than the primary link; and sending, using one or more processors and based on the first traffic load or the second traffic load, traffic from the VLAN via the primary LAG link.

2. The method of claim 1, further comprising: maintaining (N+1) bandwidth pools associated with the primary LAG link and the redundant LAG link.

3. The method of claim 1, where the bandwidth associated with the VLAN is less than or equal to the available bandwidth for primary link booking associated with the primary LAG link.

4. The method of claim 1, where the primary LAG link corresponds to a first link in the LAG and the redundant LAG link corresponds to a second link in the LAG, the method further comprising: assigning a third link, in the LAG, and the second LAG link to another VLAN, where the third link is different than the first link and the second link; and sending traffic, from the other VLAN, via the third link.

5. A method comprising: associating, using one or more processors, a link, in a link aggregation group (LAG), to a first packet buffer queue for point-to-point services, where the LAG includes a number (N) of links; associating, using one or more processors, the link, in the LAG, to a second packet buffer queue for multi-point services; allocating, using one or more processors, bandwidth to the first packet buffer queue and the second packet buffer queue; receiving, using one or more processors, information identifying a bandwidth (B) available on each link of the LAG; assigning, using one or more processors, a primary LAG link, in the LAG, and a redundant LAG link, in the LAG, to a virtual local area network (VLAN); setting, using one or more processors, an available bandwidth for primary link booking, on each link of the primary LAG link and the redundant LAG link, to (B−B/N); setting, using one or more processors, an available bandwidth for redundant link booking, on each of the primary LAG link and the redundant LAG link, to (B/N); updating information identifying bandwidth pools that are associated with the primary LAG link, where the information identifying bandwidth pools includes information identifying the available bandwidth for primary link booking associated with the primary LAG link, and where updating the information identifying the bandwidth pools includes: updating the information identifying the available bandwidth for primary link booking associated with the primary LAG link based on information identifying bandwidth associated with the VLAN; and sending, using one or more processors and via the primary LAG link, traffic from the VLAN based on the available bandwidth for primary link booking or based on the available bandwidth for redundant link booking.

6. The method of claim 5, further comprising:
maintaining (N+1) bandwidth pools associated with the primary LAG link and the redundant LAG link.

7. The method of claim 5, further comprising:
setting a traffic load of (B−B/N) on the primary LAG link when no link failure exists for the LAG; and
setting a traffic load of (B) on the primary LAG link when the LAG experiences a failure of a particular link, in the LAG, different than the primary LAG link.

8. The method of claim 5, further comprising:
defining a class of service for the point-to-point services; and
defining a class of service for the multi-point services,
where allocating the bandwidth to the first packet buffer queue and the second packet buffer-queue includes:
allocating the bandwidth to the first packet buffer queue and the second packet buffer-queue based on the class of service for the point-to-point services and the class of service for the multi-point services.

9. The method of claim 5, where the primary LAG link corresponds to a first link in the LAG and the redundant LAG link corresponds to a second link in the LAG, the method further comprising: assigning a third link, in the LAG, to another VLAN, where the third link is different than the first link and the second link; and sending traffic, from the other VLAN, via the third link.

10. A device comprising: one or more processors to: associate a link, in a link aggregation group (LAG) that includes a number (N) of links, to a first packet buffer queue for point-to-point services, associate the link, in the LAG, to a second packet buffer queue for multi-point services, allocate bandwidth to the first packet buffer queue and the second packet buffer queue, receive a bandwidth (B) available on each LAG link, assign a primary LAG link, in the LAG, and a redundant LAG link, in the LAG, to a virtual local area network (VLAN), set an available bandwidth for a primary path, on each of the primary LAG link and the redundant LAG link, to (B−B/N), set an available bandwidth for a redundant path, on each of the primary LAG link and the redundant LAG link, to (B/N), update information identifying bandwidth associated with each link of the LAG, where, when updating the information identifying bandwidth associated with each link of the LAG, the one or more processors are to: update information identifying the available bandwidth for the primary path associated with the primary LAG link based on information identifying bandwidth associated with the VLAN, and update information identifying the available bandwidth for the redundant path associated with the primary LAG link based on the information identifying bandwidth associated with the VLAN, and send traffic, from the VLAN, via the primary LAG link based on the available bandwidth for the primary path associated with the primary LAG link or based on the available bandwidth for the redundant path associated with the primary LAG link.

11. The device of claim 10, where the one or more processors are further to:
maintain (N+1) bandwidth pools associated with the primary LAG link and the redundant LAG link.

12. The device of claim 10, where the one or more processors are further to:
set a traffic load of (B−B/N) on the primary LAG link when no link failure exists on the LAG; and
set a traffic load of (B) on the primary LAG link when the LAG experiences a failure of a particular link, in the LAG, different than the primary link.

13. A system comprising: one or more network devices comprising: means for receiving information identifying a bandwidth (B) available on each link of a link aggregation group (LAG) that includes a number (N) of links; means for assigning a primary LAG link, in the LAG, and a redundant LAG link, in the LAG, to a virtual local area network (VLAN); means for setting an available bandwidth for a primary path, on each of the primary LAG link and the redundant LAG link, to (B−B/N); means for setting an available bandwidth for a redundant path, on each of the primary LAG link and the redundant LAG link, to (B/N); means for updating information identifying bandwidth pools that are associated with the primary LAG link, where the information identifying bandwidth pools includes information identifying the available bandwidth for the primary path associated with the primary LAG link, and where the means for updating the information identifying the bandwidth pools includes: means for updating the information identifying the available bandwidth for the primary path associated with the primary LAG link based on information identifying bandwidth associated with the VLAN; and means for sending traffic, from the VLAN, via the primary LAG link based on the available bandwidth for the primary path associated with the primary LAG link or based on the available bandwidth for the redundant path associated with the primary LAG link.

14. The system of claim 13, further comprising:
means for maintaining (N+1) bandwidth pools associated with the primary LAG link and the redundant LAG link.

15. The system of claim 13, further comprising:
means for setting a traffic load of (B−B/N) on the primary LAG link when no link failure exists for the LAG; and
means for setting a traffic load of (B) on the primary LAG link when the LAG experiences of a failure of a link, in the LAG, different than the primary link.

16. The system of claim 13, further comprising:
means for associating a link, in the LAG, to a first packet buffer queue for point-to-point services;
means for associating the link, in the LAG, to a second packet buffer queue for multi-point services; and
means for allocating bandwidth to the first packet buffer queue and the second packet buffer-queue.

17. The system of claim 16, further comprising:
means for defining a class of service for the point-to-point services; and
means for defining a class of service for the multi-point services,
where the bandwidth, allocated to the first packet buffer queue and the second packet buffer-queue, is allocated based on the class of service for the point-to-point services and the class of service for the multi-point services.

18. The system of claim 13, where the primary LAG link corresponds to a first link in the LAG and the redundant LAG link corresponds to a second link in the LAG, the system further comprising: means for assigning a third link, in the LAG, to another VLAN, where the third link is different than the first link and the second link; and means for sending traffic, from the other VLAN, via the third link.

* * * * *